April 24, 1928.
T. J. HUGHES
SPROCKET CHAIN
Filed June 10, 1926
1,667,259
2 Sheets-Sheet 1
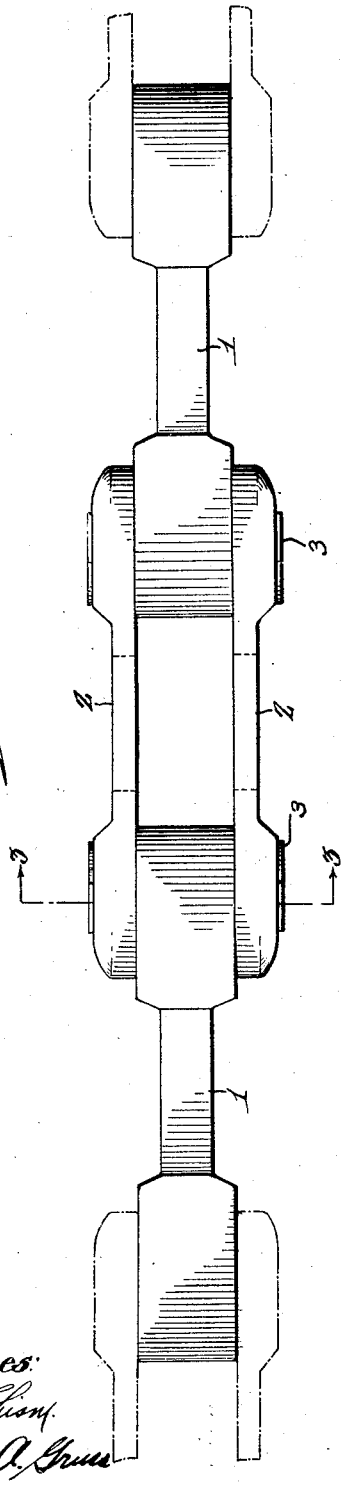
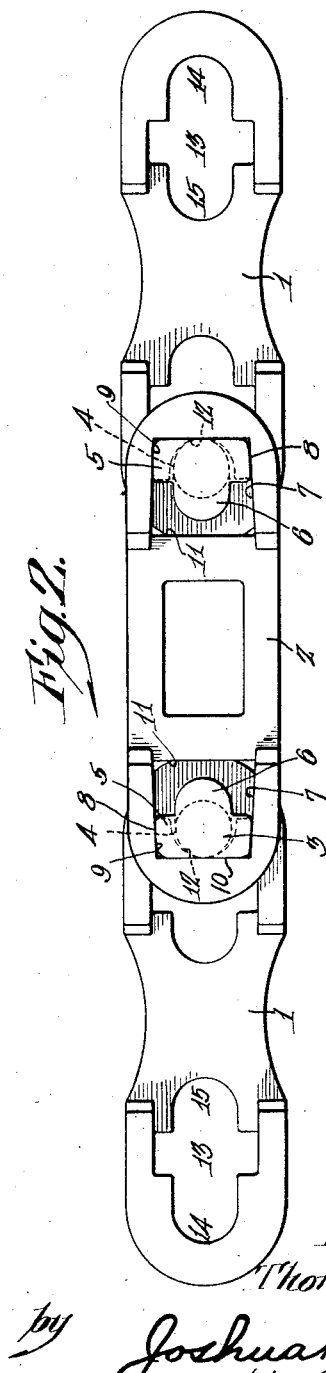
Witnesses:
Inventor
Thomas J. Hughes
by Joshua R. H. Potts
his Attorney April 24, 1928.

T. J. HUGHES

SPROCKET CHAIN

Filed June 10, 1926

1,667,259

2 Sheets-Sheet 2

Inventor
Thomas J. Hughes
by Joshua R. H. Potts
his Attorney.

Witnesses:
Walter Chung
George A. Gross

Patented Apr. 24, 1928.

1,667,259

UNITED STATES PATENT OFFICE.

THOMAS J. HUGHES, OF POTTSVILLE, PENNSYLVANIA.

SPROCKET CHAIN.

Application filed June 10, 1926. Serial No. 114,927.

This invention relates to sprocket chains and more particularly to the means for detachably connecting the links.

The objects are to provide connecting means of simple and rugged construction whereby the links may be easily connected to and disconnected from each other for replacement or repairs and to provide means which will remain in connected position under abnormal bending of the chain and long use, and thereby prevent accidental disconnection of the chain and the damages resulting therefrom.

Figure 3:
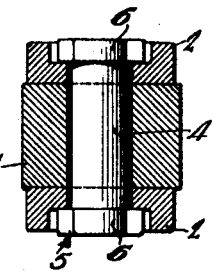
Figure 4:
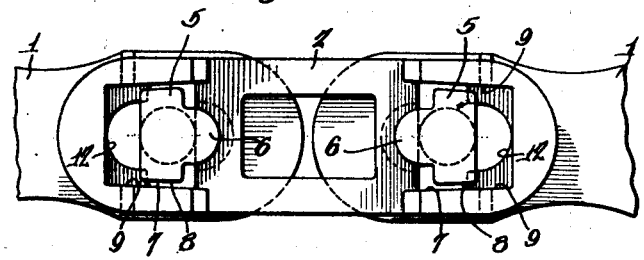
Figure 5:
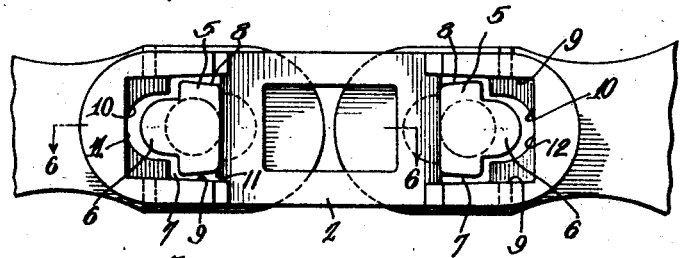
Figure 6:
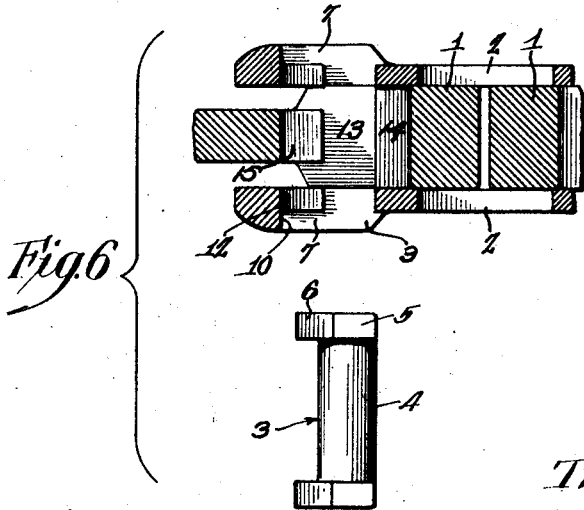

These objects, and other advantageous ends which will be described hereinafter, I attain in the following manner, reference being had to the accompanying drawings in which:

Figure 1 is a fragmentary plan view of a chain made in accordance with my invention, Figure 2 is a side view of the chain shown in Figure 1, Figure 3 is a sectional view taken in line 3—3 of Figure 1, Figure 4 a fragmentary view similar to Figure 2 showing the first step of disconnecting the links, Figure 5 a like view showing the second step, and Figure 6 a section on line 6—6 of Figure 5 showing the pin removed to allow separation of the links.

Referring to the drawings, 1 indicates the central links of a sprocket chain, 2 the side links and 3 a pintle which connects the central links to the side links.

The pintle has a cylindrical part 4 which serves as a journal for the central link, angular heads 5 on the ends of the cylindrical part, which prevent rotation and longitudinal movement of the pintle, and lugs 6 normally extending from the heads toward the center of the side links. Each head is arranged in a recess 7 at each end in the outer side of each side link with its edges 8 fitting snugly between the converging side walls 9 and against the end wall 10 of the recess. The side walls converge toward the end of the link and in addition to firmly holding the pin against rotation, permit turning of the heads to disconnect the pintle when the links are shifted slightly toward each other as shown in Figures 4 and 5.

In each recess 7 is an angular opening 11, corresponding in shape to the outline of the angular head 5 of the pintle, and a bearing notch 12 at the outer side of the opening. Each central link 1 has an angular opening 13 at each end, a bearing notch 14 at the outer side of the opening and a cut-out part 15 at the inner side of the opening.

The links are disconnected by slightly shifting the central link in between the side links, as shown in Figure 4. This brings heads 5 of the pintle out of engagement with the converging side walls 9. The pintle is then turned 180° in either direction to the position shown in Figure 5, to bring heads 5 into engagement with openings 11 and 13 and lugs 6 in alignment with bearing notches 12 and cut-out part 15. The pintle is then slipped out of the links as shown in Figure 6 and the links are separated from each other. The links may then be replaced or repaired, after which they are connected by slipping the pintle through the links and turning it 180°. The chain is then stretched to pull the links from each other and bring the edges 8 of the heads into engagement with the converging side walls 9 and the end walls 10 of the recesses.

In use, the pin is held against accidental turning by the engagement of edges 8 of the head with the side and end walls of the recess, and the links may be swung to a large angle without danger of disconnecting the chain.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

A drive chain having central links, each having a substantially rectangular opening in each end, said openings communicating with a bearing notch on one side and an extension opening on the other; side links, each having a recess at each end in its outer side, the side walls of the recess converging toward the adjacent end of the link, an extension opening and a bearing notch communicating with each said recess; a pintle for connecting a central link with two side links having a journal part adapted to engage said bearing notches, a head on each end substantially trapezoidal in shape engaging the side walls of each said recess, a projection on said head normally out of line with said extension openings, whereby upon the shifting of said central links toward each other, the head on each side of said pintle is disengaged from said side walls and upon revolving said pintle 180° said projection is brought in alignment with said extension openings, enabling said pintle to be passed through all said links.

In testimony whereof I have signed my name to this specification.

THOMAS J. HUGHES.